United States Patent

[11] 3,634,774

[72] Inventor Paul H. Carr
Bedford, Mass.
[21] Appl. No. 54,954
[22] Filed July 15, 1970
[45] Patented Jan. 11, 1972
[73] Assignee The United States of America as represented by the Secretary of the Air Force

[54] ACOUSTIC SURFACE WAVE PARAMETRIC AMPLIFIER
6 Claims, 9 Drawing Figs.

[52] U.S. Cl. .......... 330/4.6, 330/5.5
[51] Int. Cl. .......... H03f 7/00
[50] Field of Search .......... 330/5.5, 4.6

[56] References Cited
UNITED STATES PATENTS
3,551,837 12/1970 Speiser et al .......... 330/5.5
OTHER REFERENCES
Chao, " Applied Physics Letters," May 15, 1970, pp. 399–401

*Primary Examiner*—Roy Lake
*Assistant Examiner*—Darwin R. Hostetter
*Attorneys*—Harry A. Herbert, Jr. and Willard R. Matthews, Jr.

ABSTRACT: The acoustic surface-wave signal resulting from colinear interaction of pump and input signals is found to have an amplifying difference signal component and an overriding attenuating sum signal component. Amplification is achieved by noncolinear interaction of acoustic surface waves at an angle that utilizes the elastic anisotropic characteristics of certain substrate materials to suppress the sum signal component.

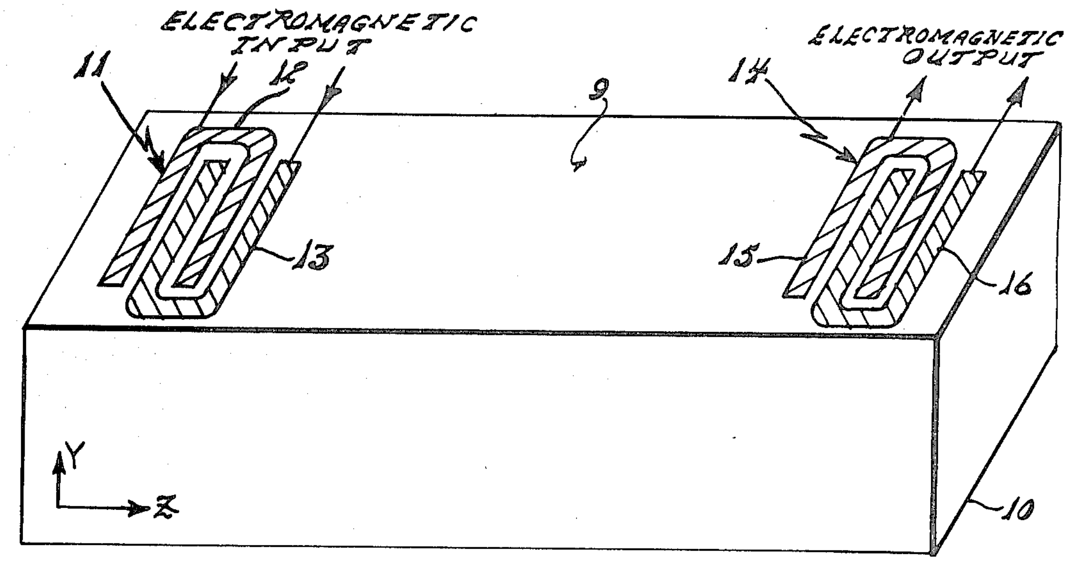
FIG. 1
PRIOR ART
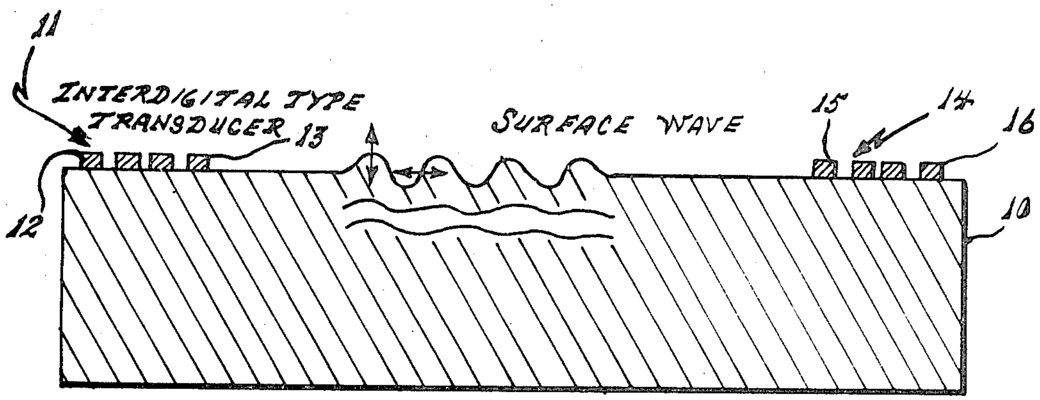
FIG. 1-A
PRIOR ART
INVENTOR.
PAUL H. CARR
BY Harry A. Herbert Jr. and Willard R Matthews Jr.
ATTORNEYS

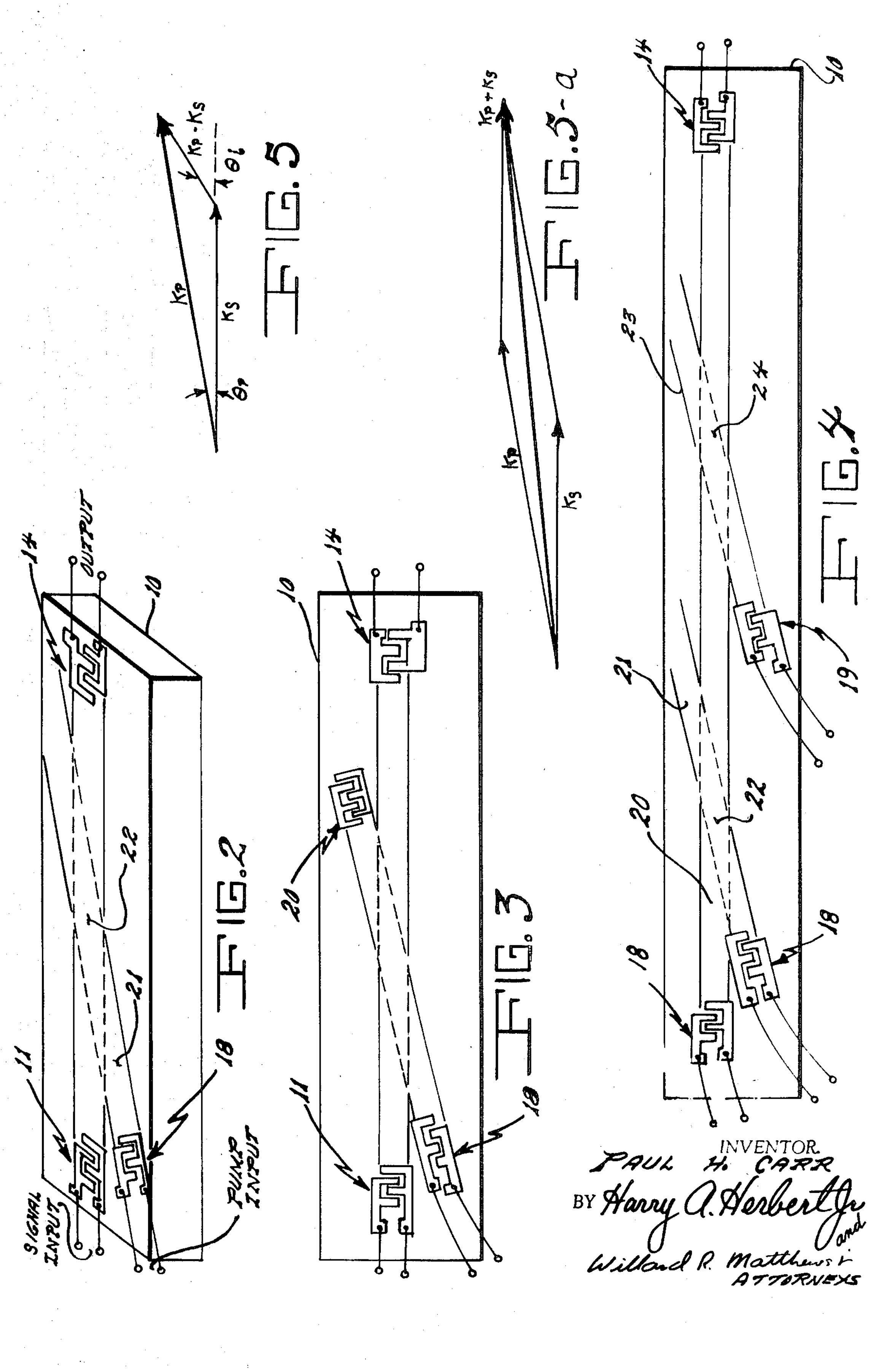
FIG. 2, FIG. 3, FIG. 4, FIG. 5, FIG. 5-a
INVENTOR
PAUL H. CARR
BY Harry A. Herbert Jr. and
Willard R. Matthews
ATTORNEYS INVENTOR.
PAUL H. CARR
BY Harry A. Herbert Jr. and
Willard R. Matthews
ATTORNEYS

ACOUSTIC SURFACE WAVE PARAMETRIC AMPLIFIER

BACKGROUND OF THE INVENTION

This invention relates to acoustic surface-wave devices and in particular to methods and structures that achieve parametric amplification of acoustic surface waves.

Volume or bulk wave acoustic devices such as acoustic delay lines, phase shifters and directional couplers have been used in microwave systems for some time. Recently, in an attempt to reduce power requirements, considerable effort has been expended to perfect various acoustic surface-wave devices.

Microwave-frequency surface-wave devices have several advantages over their volume-wave counterparts. Surface waves require only one optically polished surface, whereas volume waves require two surfaces which must be parallel to optical tolerances. The fabrication techniques for surface-wave transducers are the same as those used for integrated circuits, so that a surface-wave delay line could, for example, be fabricated on a substrate together with a transistor amplifier. The amplification of surface waves by means of their traveling wave interaction with drifting carriers in semiconductors has several advantages over the corresponding amplification of volume waves. The surface wave is accessible along the entire surface, so it is possible to make contiguously tapped delay lines for such signal-processing functions as pulse expansion and compression. Magnetic surface waves on ferrimagnetic substrates have been found to be nonreciprocal and this makes them of potential use for such devices as isolators, circulators, and phase shifters. Acoustic surface-waveguides and directional couplers have been fabricated for use at megahertz frequencies. The width of acoustic waveguide components at microwave frequencies would be of the order of micrometers. Thus, there exists the possibility of entire microwave acoustic-integrated circuits which could be as much as five orders of magnitude smaller than their electromagnetic equivalents.

The current state of the art of microwave acoustic surface-wave devices is reviewed in detail in the publication, *The Generation and Propagation of Acoustic Surface Waves at Microwave Frequencies*, by Paul H. Carr, *IEEE Transactions on Microwave Theory and Techniques*, Vol. MTT–17, Nov. 1969.

Acoustic surface-wave devices are inherently small, lightweight and rugged and are therefore particularly adapted to airborne and aerospace applications. With reference to airborne radar applications, the use of microwave frequencies is the only way to obtain the 0.5—1 GHz. bandwidths necessary to improve range resolution. In addition, the operation of signal-processing devices at microwave frequencies eliminates the necessity for frequency down-conversion and subsequent up-conversion with its insertion loss, increased complexity, and loss of phase information. There is, therefore, a current need for efficient, small, rugged, lightweight microwave acoustic signal-processing devices of all types. Such signal-processing devices currently find particular application in radiation-hardened systems; that is signal-processing systems that do not use carrier devices such as semiconductors and the like that are subject to malfunction in the vicinity of nuclear explosions. Acoustic devices are impervious to the adverse effects of a high-level radiation environment and a totally acoustic signal-processing system would be extremely desirable for ICBM and other applications. A need therefore exists for acoustic amplifiers that have appreciable gain and moderate power requirements. Furthermore, such amplifiers can advantageously be used in conjunction with microwave-frequency surface-wave delay lines in large time-bandwidth signal-processing filters in radar; in airborne false target generators in electronic countermeasures systems; and in fuses for advanced missiles. In the present state of the art it is not possible to make microwave-frequency surface-wave delay lines having delays in excess of about 10 microseconds due to prohibitively large propagation losses.

Acoustic volume wave amplification has, in one instance, been achieved by N. Shiren as disclosed in the 1964 publication Applied Physics Letters, Volume 4, page 82. Shiren's approach comprehends suppression of the sum signal component of colinear interacting pump and input signals by dispersion at the sum frequency by means of the spin phonon interaction on $Fe^{+2}$-doped MgO. Such a device however is extremely difficult to fabricate consistently to rigid specifications. Furthermore, the use of $Fe^{+2}$-doped MgO requires the use of magnetic fields and cryogenic temperatures.

Another prior art approach toward achieving acoustic surface-wave amplification is disclosed by Andrew Slobodnik in U.S. Pat. application Ser. No. 24,691 filed A1 Apr. 1970 entitled *Acoustic Surface Wave Amplifier and Method of Fabrication*. Slobodnik's device utilizes certain nonlinear characteristics of crystalline media to achieve amplification. Such an approach however, requires that modulation and demodulation be accomplished at appropriate points on the substrate member surface. Acoustic surface-wave modulation and demodulation means are difficult to fabricate.

The present invention is directed toward overcoming the above-enumerated and other problems, associated with providing amplification means for reliable, lightweight, radiation-hardened signal-processing systems.

SUMMARY OF THE INVENTION

The present invention comprises method and means for effecting amplification of acoustic surface waves. It utilizes a pump frequency signal to achieve parametric amplification of the signal to be amplified.

The net power $P_s$ resulting from the colinear interaction of two acoustic surface waves (an input signal and a pump signal) is represented by the so-called Manley Rowe relations to be:

$$P_s\alpha = C\left[-f_s + f_s\left(1-\frac{f_s}{f_p}\right)\right] \qquad (1)$$

The expression $-f_s$ represents an attenuating effect on the resultant signal and the expression $f_s\,(1-f_s/f_p)$ represents an amplifying effect. For colinear interaction the net power $P_s$ is $-f_s/f_p$.

The present invention achieves amplification by utilizing the anisotropic properties of certain substrate materials (such as lithium niobate, topaz, quartz or bismith germinate) to discriminate against the sum frequency components $-f_s$. This is accomplished by noncolinear interaction between the pump and input signals. The essence of the invention therefore resides in the parametric amplification of acoustic surface waves by noncolinear interaction of pump and input signals and determining an appropriate angle at which to apply this pump signal. The invention also comprehends equations adapted to analytically determine such angles. Various structures including those having multiple pump signals and pump-signal-reflecting means can be constructed in accordance with the concepts of the invention.

It is a principal object of the invention to provide a new and improved microwave acoustic surface-wave amplifier.

It is another object of the invention to provide a new and improved method of achieving amplification of microwave acoustic surface waves.

It is another object of the invention to provide an acoustic surface-wave parametric amplifier that does not require modulation and demodulation means.

It is another object of the invention to provide an acoustic surface-wave parametric amplifier that is effectively radiation hardened.

It is another object of the invention to provide a broadband acoustic surface-wave parametric amplifier.

It is another object of the invention to provide an acoustic surface-wave parametric amplifier having unidirectional gain characteristics.

It is another object of the invention to provide an acoustic surface-wave parametric amplifier that is small, lightweight, rugged and adaptive to airborne and aerospace applications.

These, together with other objects, advantages and features of the invention will become more apparent from the following detailed description when taken in conjunction with the illustrative embodiments in the accompanying drawings.

DESCRIPTION OF DRAWINGS

FIG. 1 is an orthogonal view of a microwave-frequency acoustic surface-wave delay line;

FIG. 1A is a side view of the delay line of FIG. 1 schematically illustrating acoustic surface waves propagating therealong;

FIG. 2 is an orthogonal view of one embodiment of the invention;

FIG. 3 is a plan view of a second embodiment of the invention;

FIG. 4 is a plan view of a third embodiment of the invention;

FIG. 5 is a vector diagram of the difference components of interacting acoustic wave input and pump signals;

FIG. 5A is a vector diagram of the sum components of said interacting input and pump signals;

DESCRIPTION OF THE PREFERRED EMBODIMENT

Figure 7:
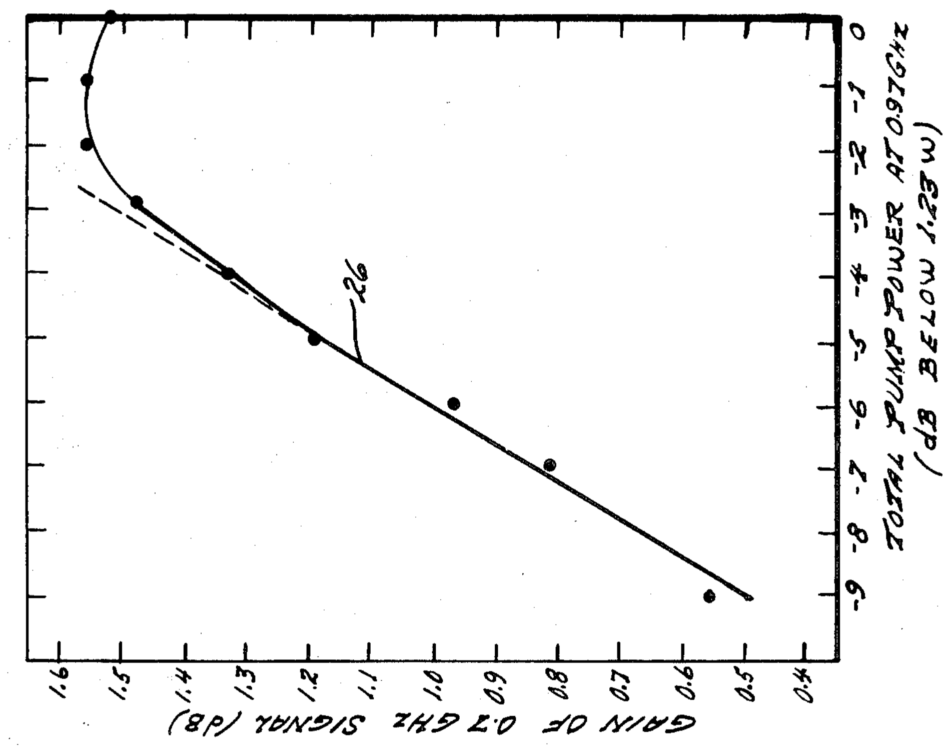
FIG. 7 is a graph illustrating pump signal power versus input signal gain of an acoustic surface-wave amplifier incorporating the principles of the invention.

Referring now to FIGS. 1 and 1A, there is illustrated thereby an acoustic surface-wave device comprising substrate member 10, input transducer 11 and output transducer 14. Substrate member 10 can be any suitable crystalline media or piezoelectric material that is elastically anisotropic such as lithium niobate, topaz, sapphire, quartz or bismuth germinate. Input transducer 11 consists of interdigital fingers 12 and 13 which may be affixed to the propagating surface 9 by photolithographic reproduction or integrated-circuit techniques. Output transducer 14 consisting of interdigital fingers 15 and 16 is similarly affixed to surface 9. The operation of such a device when used as a delay line is illustrated by FIG. 1A. The electromagnetic wave input produces an electric field between the half-wavelength-spaced lines of the interdigital-type transducer on the piezoelectric substrate. The piezoelectric effect produces a stress which propagates along the surface in both directions, the two acoustic powers being equal by symmetry. The surface wave propagating toward the output transducer is detected by means of the piezoelectric effect. The wave propagating toward the output transducer is detected by means of the piezoelectric effect. The wave propagating in the opposite direction can be terminated by an acoustic absorber such as wax or tape (not shown).

Acoustic delay lines of the type illustrated by FIG. 1 are currently known and used. Dissipation and propagation losses of the signal being delayed by such a device however, limits the maximum delay time available. Amplification of the signal to the extent that inherent losses are overcome would of course provide delay lines capable of any desired delay time. Also amplification in excess of the inherent losses of such devices can be used to provide a signal amplifier. The principles of the present invention are applicable to both, the end use of the device being a matter of engineering design.

The present invention comprehends parametric amplification of the input signal through interaction with a pump signal. The interaction of colinear acoustic surface waves is reviewed in detail in the inventor's published U.S. Air Force report entitled *Harmonic Generation of Microwave Phonons*, AFCRL–69cy0052 Feb. 1969, Physical Sciences Research Papers No. 369. It is demonstrated therein that the net effect of colinear interaction is one of attenuation rather than amplification. This is established by the derived equations:

$$W_i = W_p - W_s \text{ and,} \quad (2)$$

$$\vec{K}_i = \vec{K}_p - \vec{K}_s, \quad (3)$$

where the subscripts $i$, $p$, and $s$ refer to the idler pump and signal respectively. Equation (2) represents the conservation of energy and equation (3) represents the conservation of "quasi-momentum." The term "quasi-momentum" is used as a phonon cannot transport momentum as such. The terms of equation (3) are vector quantities and are illustrated by FIGS. 5 and 5*a* wherein FIG. 5 shows the amplifying difference signal and FIG. 5*a* shows the attenuating sum signal.

Figure 6:
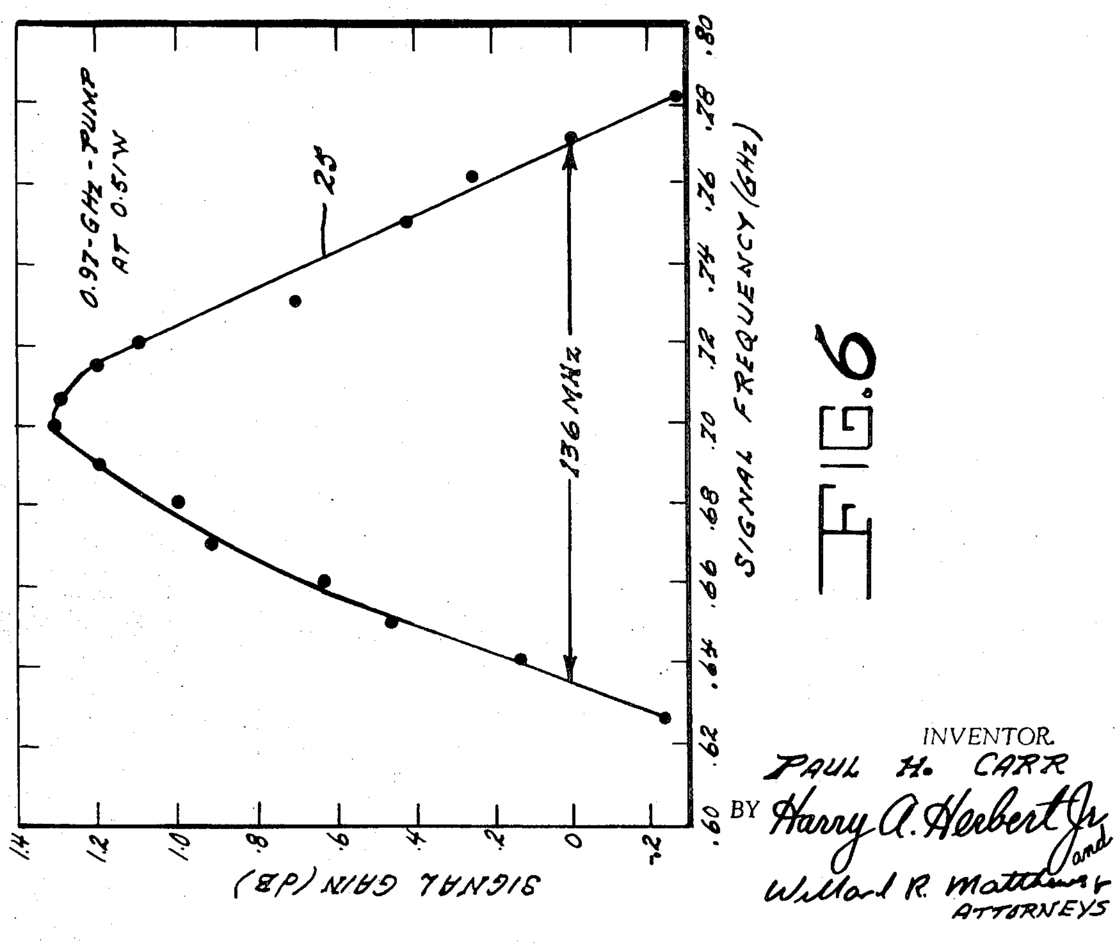
FIG. 6 is a graph illustrating frequency verses signal gain of an acoustic surface-wave amplifier incorporating the principles of the invention.

The basic concept of the present invention comprises the use of the elastic anisotropic properties of certain substrate members to suppress the attenuating sum frequency components resulting from the interaction of input and pump signals. This is accomplished by making the pump signal propagate at an angle with respect to the input signal. The angle and relative frequencies of the pump and input signals are determined by solving equations (2) and (3). These equations are not independent and must be solved with the use of this additional linear dispersion relations $W_i = K_i V_i$. These relations are well satisfied in the microwave-frequency region. The resulting equation is:

$$\left(\frac{W_p}{W_s}\right)^2 \left(\frac{1}{V_p} - \frac{1}{V_i}\right)^2 + 2\left(\frac{W_p}{W_s}\right)\left[\frac{\cos(\theta_p - \theta_i)}{V_p V_i} - \frac{1}{V_i^2}\right] + \left(\frac{1}{V_i^2} - \frac{1}{V_s^2}\right) = 0 \quad (4)$$

where $V_i$, $V_p$ and $V_s$ refer respectively to the velocities of the idler, the pump, and the signal. These velocities are, of course, different due to the elastic anisotropic of the substrate material. By way of example, equation (4) when solved as a function of the idler angle $\theta_i$ for a fixed value of pump angle, $\theta_p = 4°$ gives frequency ratios $W_p/W_s$ of 1.56 and 1.20 for idler angles of 6° and 7° respectively. Amplification range can be determined by fixing the pump signal in both frequency and direction and varying the frequency of the input signal. FIGS. 6 and 7 illustrate curves showing frequency bandwidth and power gain of a typical embodiment of the invention.

Referring now to FIG. 2 there is illustrated thereby a first embodiment of the invention. Substrate member 10 of elastically anisotropic material has electromagnetic wave to acoustic surface-wave input transducers 11 and 18 disposed on one polished surface at relative angles that cause acoustic surface waves emanating therefrom to interact in the area 22 (designated by dashed lines). Acoustic surface wave to electromagnetic wave output transducer 14 is located on said polished surface to receive the acoustic surface wave resulting from the interaction of the outputs of input transducer 11 and 18. The input and output transducer comprise interdigital fingers that are spaced to accommodate the desired operating frequency of the device. They can be readily affixed to the polished surface of the substrate member by printed circuit or integrated circuit techniques.

FIG. 3 illustrates an alternative embodiment of the invention that includes means for reflecting the pump signal. The reflector 20 can be an interdigital device similar to the input and output transducer. It would advantageously have more lines or interdigital fingers than the input and output transducers however, and it can also be electrically terminated to increase reflectivity. The reflected pump signal has this effect of further amplifying the input signal.

Another approach toward providing greater amplification is illustrated by the embodiment of the invention shown in FIG. 4. In this embodiment an additional input transducer 19 is provided wherefrom a second pump signal can be made to interact with the input signal at an appropriate angle to provide additional amplification. This second pump signal 23 would in the present case interact with the input signal in dashed area 24. It would also be possible of course to provide any feasible number of such pump signals depending on the size and frequency of the device and upon the amplification requirements.

Although not shown, devices having all interaction angles are comprehended by the invention. Pump signals directed at 90° angles to the input signal have been found to produce a maximum suppression of the sum frequency component. Such an arrangement however, greatly reduces the interaction area. The angle of interaction then in any given instance represents a trade off of suppression and interaction area and is a matter of engineering design choice.

While the invention has been described in its preferred embodiments, it is understood that the words which have been used are words of description rather than words of limitation and that changes within the purview of the appended claims may be made without departing from the scope and spirit of the invention in its broader aspects.

What is claimed is:

1. The method of providing parametric amplification of an acoustic surface-wave input signal propagating on the surface of an elastically anisotropic substrate member comprising the step of applying an acoustic surface-wave pump signal to said substrate member to interact with said surface-wave input signal at an angle that effects substantial suppression of the sum frequency components generated by the interaction of said input and pump signals.

2. The method of claim 1 including the further step of applying at least one additional acoustic surface-wave pump signal to said substrate member.

3. The method of claim 1 including the further step of reflecting said pump signal to reinteract with said surface-wave signal.

4. An amplifier comprising a substrate member of elastically anisotropic material having a surface adapted to permit the propagation of acoustic surface waves therealong, a first electromagnetic wave to acoustic surface-wave input transducer disposed on the propagation surface of said substrate member, an acoustic surface wave to electromagnetic wave transducer disposed on said propagation surface in position to receive acoustic surface waves emanating from said input transducer, a second electromagnetic wave to acoustic surface-wave input transducer disposed on said propagation surface oriented to effect angular interception of acoustic surface waves emanating therefrom with acoustic surface waves emanating from said first input transducer, means for applying an electromagnetic wave input signal to said first input transducer, and means for applying an electromagnetic wave pump signal to said second input transducer.

5. An amplifier as defined in claim 4 wherein said second input transducer is oriented to effect an interaction between the pump signal acoustic surface waves emanating therefrom and the input signal acoustic surface wave emanating from said first input transducer at an angle that effects substantial suppression of the sum frequency components generated by the interaction of said input and pump signals.

6. An amplifier as defined in claim 4 including at least one additional electromagnetic wave to acoustic surface-wave input transducer, said additional input transducers being oriented to effect angular interception of acoustic surface waves emanating therefrom with acoustic surface waves emanating from said first input transducer, and means for applying an electromagnetic wave pump signals to each said additional input transducer.

* * * * *